(12) United States Patent
Cromer et al.

(10) Patent No.: US 7,853,804 B2
(45) Date of Patent: Dec. 14, 2010

(54) SYSTEM AND METHOD FOR SECURE DATA DISPOSAL

(75) Inventors: Daryl Carvis Cromer, Cary, NC (US); Howard Jeffrey Locker, Cary, NC (US); Randall Scott Springfield, Chapel Hill, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 739 days.

(21) Appl. No.: 11/852,418

(22) Filed: Sep. 10, 2007

(65) Prior Publication Data

US 2009/0070598 A1   Mar. 12, 2009

(51) Int. Cl.
  G06F 11/30 (2006.01)
  G06F 7/04 (2006.01)
  H04L 29/06 (2006.01)
(52) U.S. Cl. ............... 713/193; 713/164; 726/16
(58) Field of Classification Search ............ 713/13, 713/193, 164; 726/16
See application file for complete search history.

(56) References Cited

U.S. PATENT DOCUMENTS

| | | | |
|---|---|---|---|
| 6,185,678 B1 * | 2/2001 | Arbaugh et al. ............... 713/2 |
| 7,603,707 B2 * | 10/2009 | Seifert et al. ................. 726/22 |
| 7,711,960 B2 * | 5/2010 | Scarlata ....................... 713/182 |
| 7,765,392 B2 * | 7/2010 | Cheng et al. .................... 713/2 |
| 2002/0188763 A1 * | 12/2002 | Griffin ........................ 709/310 |
| 2003/0037246 A1 * | 2/2003 | Goodman et al. ............ 713/191 |
| 2003/0097578 A1 * | 5/2003 | England et al. .............. 713/191 |
| 2003/0188179 A1 * | 10/2003 | Challener et al. ............ 713/193 |
| 2004/0117625 A1 * | 6/2004 | Grawrock .................... 713/168 |
| 2005/0132031 A1 * | 6/2005 | Sailer et al. .................. 709/223 |
| 2005/0138370 A1 * | 6/2005 | Goud et al. .................. 713/164 |
| 2005/0251857 A1 * | 11/2005 | Schunter et al. ............... 726/16 |
| 2005/0262571 A1 * | 11/2005 | Zimmer et al. ................ 726/27 |
| 2005/0283826 A1 * | 12/2005 | Tahan ............................ 726/2 |
| 2006/0005000 A1 * | 1/2006 | King et al. ...................... 713/1 |
| 2006/0010326 A1 * | 1/2006 | Bade et al. ................... 713/176 |
| 2006/0015717 A1 * | 1/2006 | Liu et al. ..................... 713/164 |

(Continued)

OTHER PUBLICATIONS

Microsoft, "*BitLocker Drive Encryption Technical Overview*," online location: http://www.microsoft.com/whdc/system/platform/hwsecurity/BitLockerTechOver.mspx, May 16, 2006.

(Continued)

*Primary Examiner*—Techane J Gergiso
(74) *Attorney, Agent, or Firm*—VanLeeuwen & VanLeeuwen; Carlos Munoz-Bustamante (57) ABSTRACT

A system, method, and program product is provided that initializes expected PCRs stored in a TPM by generating and storing a random number, seeding expected PCRs with the random number, inputting a set of startup code processes to a hash algorithm resulting in a set of hash values, updating the expected PCRs using the set of hash values, and saving the expected PCRs in a nonvolatile data area that is secured by the TPM. Upon reboot, the random number is retrieved from the nonvolatile data area, the PCRs are seeded with the retrieved random number, the startup code processes are input to the hash algorithm process resulting in another set of hash values, the PCRs are updated using the resulting set of hash values, and an encrypted data object is decrypted in response to the PCRs being the same as the expected PCRs.

17 Claims, 6 Drawing Sheets

U.S. PATENT DOCUMENTS

| | | | |
|---|---|---|---|
| 2006/0015718 A1* | 1/2006 | Liu et al. | 713/164 |
| 2006/0015732 A1* | 1/2006 | Liu | 713/176 |
| 2006/0026423 A1* | 2/2006 | Bangerter et al. | 713/164 |
| 2006/0026693 A1* | 2/2006 | Bade et al. | 726/34 |
| 2006/0031790 A1* | 2/2006 | Proudler et al. | 716/1 |
| 2006/0053302 A1* | 3/2006 | Yasaki et al. | 713/183 |
| 2006/0075223 A1* | 4/2006 | Bade et al. | 713/162 |
| 2006/0095505 A1* | 5/2006 | Zimmer et al. | 709/203 |
| 2006/0112420 A1* | 5/2006 | Challener et al. | 726/5 |
| 2006/0137022 A1* | 6/2006 | Kilian-Kehr et al. | 726/27 |
| 2006/0155988 A1* | 7/2006 | Hunter et al. | 713/164 |
| 2007/0016766 A1* | 1/2007 | Richmond et al. | 713/100 |
| 2007/0073937 A1* | 3/2007 | Feinberg et al. | 710/62 |
| 2007/0101156 A1* | 5/2007 | Novoa et al. | 713/190 |
| 2007/0220500 A1* | 9/2007 | Saunier | 717/162 |
| 2007/0260866 A1* | 11/2007 | Wang et al. | 713/2 |
| 2008/0126779 A1* | 5/2008 | Smith | 713/2 |
| 2008/0165971 A1* | 7/2008 | de Cesare et al. | 380/277 |
| 2008/0250252 A1* | 10/2008 | Tasher et al. | 713/189 |
| 2008/0270781 A1* | 10/2008 | Ibrahim et al. | 713/2 |
| 2009/0049514 A1* | 2/2009 | Yan et al. | 726/1 |

OTHER PUBLICATIONS

Microsoft, "*BitLocker Drive Encryption—Glossary*," online location: http://www.microsoft.com/whdc/system/platform/hwsecurity/BitLockerGlossary.mspx, May 16, 2006.

* cited by examiner

SYSTEM AND METHOD FOR SECURE DATA DISPOSAL

BACKGROUND OF THE INVENTION

1. Technical Field

The present invention relates to a system and method that securely disposes of data. More particularly, the present invention relates to a system and method that makes data inaccessible in an encrypted file system by using a random seed value.

2. Description of the Related Art

Trusted computing involves incorporating security measures into the core of a computing platform. Although administrators may achieve limited security using software-based security, administrators can only trust such software-based security to the extent they trust the hardware or software running the software-based security application. For example, a virus in the Master Boot Record (MBR) could load before the operating system and cause damage that remains undetected by any software-based security applications run by the operating system. To achieve trusted computing, an administrator needs confidence that a wrongdoer has not maliciously modified the software, firmware, and hardware since the last system boot. In other words, an administrator should feel confident that the combination of hardware and software that comprise the platform is operating properly and according to some specification. In order to compare the state of the platform to a specification, an administrator needs the ability to reliably measure and report information about the platform. This measured information is then validated to declare that the platform is exactly what it says it is and can be trusted for a given purpose. The goal of trusted computing is to provide confidence in the state of the data processing system from power-up to shutdown.

One method to provide administrators with such confidence is through the use of a separate, secure piece of hardware known as a Trusted Platform Module (TPM). A TPM could be made according to specifications recognized by the Trusted Computing Group (TCG). The TCG is an industry-standards organization that promotes security across computing platforms in personal computers (PCs), personal digital assistants (PDAs), and mobile phones, for example. TCG provides specifications for TPMs to allow computer administrators to assert ownership of a platform while allowing users the ability to perform job functions. The TPM specification defines a Core Root of Trust for Measurement (CRTM) to ensure compatibility and security among computing platforms. The TPM is also known as the "Hardware Root of Trust."

A root of trust is a set of unconditionally trusted functions that serve as the foundation on which all other trust is built. Upon booting up a computer, the execution of the platform begins with execution of the CRTM. For a PC, the CRTM may either be the entire BIOS boot block or a portion of the BIOS boot block. The integrity of the CRTM is the foundation for the trust in the rest of the system after boot-up. Therefore, both the CRTM and TPM should be protected against hardware and software attacks.

The CRTM measures the integrity of software during boot-up and runtime. For a PC, the CRTM measures the code in the BIOS, the MBR and other firmware. The CRTM can measure the code by performing a hash function on the code. These measurements reflect the state of the software at the time of the hash. The CRTM then reports the measurements to the TPM. Upon receiving the measurements, the TPM may compare the measurements to known values. If the measurements do not match the known values, the system may stop booting or report the measurements as "not trusted" after the boot sequence is finished.

The CRTM provides security throughout the boot and run process by extending the root of trust into a chain of trust. The chain of trust provides assurance that the system boot was carried out by trusted firmware and that every application since the boot can be trusted. In a PC, the chain of trust begins by the CRTM reporting on itself. The CRTM then first measures and reports on the BIOS. The BIOS then measures and reports on the boot loader. The boot loader, in turn, measures the operating system (OS) kernel. The OS then uses the TPM to measure drivers and other applications. In summary, every TCG compliant software module must measure any modules that it calls. With this system, as long as software is measured and the result stored before execution, any unauthorized software cannot hide itself. If unauthorized software is present, it will be reflected in an unexpected hash result stored by the TPM.

The TPM stores hash results in Platform Configuration Registers (PCRs) and a corresponding measurement log in memory external to the TPM. The PCRs contain values representing the sequence of measurements and the measurement log contains a full history of all measurements. The log and PCR values can be used to validate one another. In an example of this process, the CRTM creates a hash of the software about to run and then reports a description of the measured software and the measurement itself to the TPM. The TPM stores the description and measurement in a log. Next the TPM appends the measurement to the value already stored in the appropriate PCR, hashes this new value, and replaces the existing value in the PCR with the new hashed value. A platform's specification may dictate to which PCR a measurement is stored.

In a trusted platform implementing TCG specifications, a hash function is used, such as a SHA-1 hash function. A PCR contains what may be known as a SHA-1 digest, which is just the value representing the hash of the measured code. PCRs are initialized to zero at boot up. According to TCG specifications, the SHA-1 function concatenates the present value of the SHA-1 digest with the code to be measured. The concatenated value is then hashed and the result is stored in a particular PCR register. The data processing system then extends a given PCR by concatenating a new data or software with the stored value, hashing the concatenation, and storing the resulting hash value in the PCR. Therefore, as the process of measuring software proceeds, the SHA-1 digest contains the hash of a previously hashed value (i.e., the hash of a hash of a hash, etc.). Through such a sequence, a single PCR value can record a limitless sequence of values. In a TCG system, the value of the SHA-1 digest changes with each hash, but the address size of the SHA-1 digest is a predetermined size (e.g., 20 bytes).

A program may ask the TPM to "seal" objects or data to a certain PCR value. The PCR value represents the platform state. Sealing protects storage and allows access only when the platform state as recording in the PCR matches a certain value. Sealed data can only be unsealed if the PCR has a specified value. For example, a developer can seal certain data until after a program loads and runs three software programs, for instance the BIOS, the operating system, and a keyboard driver. After running the BIOS, the operating system, and the keyboard driver, the value in a specific PCR would be the correct value, assuming the system was secure to that point. If the value of the PCR reached the required state, the TPM would release a key to be used by an entity to access the data or code object.

Sealing data to a specific platform state can prevent a breach of confidential data when data storage is not under the designated software or when the data is moved to another platform. If unexpected software was booted or a virus entered the code about to be run, the PCR value will not match and the unseal will fail.

Sealing data to a particular platform state can also be referred to as "locking" the data. For example, a programmer could lock data to a keyboard driver. Only after the keyboard driver was loaded and measured could the data be accessed. This is because only after the keyboard code was measured and loaded would the platform state, as displayed by the PCR registers, be correct for unlocking the data.

Therefore, the TPM of a trusted platform can provide facilities for securely and reliably storing and reporting integrity metrics. A challenge of using current TPM implementations, however, is controlling data stored on machines. In response to the need to control data, drive encryption technologies, such as Microsoft Corporation's BitLocker™ Drive Encryption, is used to encrypt data on a system. In some drive encryption technologies, including Microsoft's BitLocker™ drive encryption, the encryption key used to control (read/write) the data is protected by the hash values in the TPM. While such drive encryption technologies aid in the control of data, secure disposal of the data is still a challenging problem. This is because these technologies rely on deleting (erasing) the file that is used to store the encryption key. However, if any copies of the file used to store the encryption key exist (e.g., backup media, copies on external devices, etc.), then secure disposal is circumvented by copying the encryption key file back to the machine's nonvolatile storage (e.g., to the computer system's hard drive).

SUMMARY

It has been discovered that the aforementioned challenges are resolved using a system, method and computer program product that initializes expected Platform Configuration Registers (PCRs) stored in a secure nonvolatile memory in a Trusted Platform Module (TPM). The initialization is performed by generating a random number, storing the generated random number in a nonvolatile memory, seeding one or more expected PCRs with the generated random number, inputting a set of startup code processes to a hash algorithm process resulting in a set of hash values, updating the expected PCRs using the set of hash values, and saving the expected PCRs in a nonvolatile memory that is secured (sealed) by the TPM (e.g., a data blob). When the system is rebooted, the previously stored random number is retrieved from the nonvolatile memory, the PCRs are seeded with the retrieved random number, the startup code processes are input to the hash algorithm process resulting in another set of hash values, the PCRs are updated using the second plurality of hash values, and an encrypted data object (e.g., storing a drive encryption key) is decrypted in response to the PCRs being the same as the corresponding expected PCRs.

In one embodiment where a drive encryption key is stored in the encrypted data object, the system stores encrypted files with each of the encrypted files encrypted using the drive encryption key that is stored in the encrypted data object. In this embodiment, when the user wishes to effectively erase all data in the encrypted files system (all of the encrypted files), the stored random number is modified. In this manner, when the system is rebooted with a different stored random number, the PCR values will be seeded with a different number and the PCRs will no longer be the same as the expected PCRs so the TPM will not unseal the encrypted data object. Without the encrypted data object being unsealed, the encrypted files stored in the encrypted file system will not be able to be accessed, thus effectively erasing the encrypted files maintained by the encrypted file system.

In one embodiment, the startup code processes include one or more BIOS processes and one or more operating system boot processes. Also in one embodiment, the random number is generated using a random number generator included in the TPM. When a user wishes to activate the seeding of the expected PCRs with the random number, the system gathers authentication data from the user, and stores the received authentication data in a secure nonvolatile storage area.

In one embodiment, when the user wishes to effectively erase the encrypted files that are being managed by the encrypted file system, the user is prompted for the user authentication data. If the authentication data provided by the user matches the authentication data previously provided, then the system modifies the stored random number. As previously explained, when the stored random number is modified, upon rebooting the machine, the PCRs will no longer match the expected PCRs and the TPM will not unseal the encrypted data object where the drive encryption key is stored and, therefore, the encrypted file system will be unable to access any of the encrypted files. In one embodiment, the stored random number is modified by generating a new random number that overwrites the previous stored random number.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

Certain specific details are set forth in the following description and figures to provide a thorough understanding of various embodiments of the invention. Certain well-known details often associated with computing and software technology are not set forth in the following disclosure, however, to avoid unnecessarily obscuring the various embodiments of the invention. Further, those of ordinary skill in the relevant art will understand that they can practice other embodiments of the invention without one or more of the details described below. Finally, while various methods are described with reference to steps and sequences in the following disclosure, the description as such is for providing a clear implementation of embodiments of the invention, and the steps and sequences of steps should not be taken as required to practice this invention. Instead, the following is intended to provide a detailed description of an example of the invention and should not be taken to be limiting of the invention itself. Rather, any number of variations may fall within the scope of the invention, which is defined by the claims that follow the description.

The following detailed description will generally follow the summary of the invention, as set forth above, further explaining and expanding the definitions of the various aspects and embodiments of the invention as necessary. To this end, this detailed description first sets forth a computing environment in FIG. 1 that is suitable to implement the software and/or hardware techniques associated with the invention. A networked environment is illustrated in FIG. 2 as an extension of the basic computing environment, to emphasize that modern computing techniques can be performed across multiple discrete devices.

Figure 1:
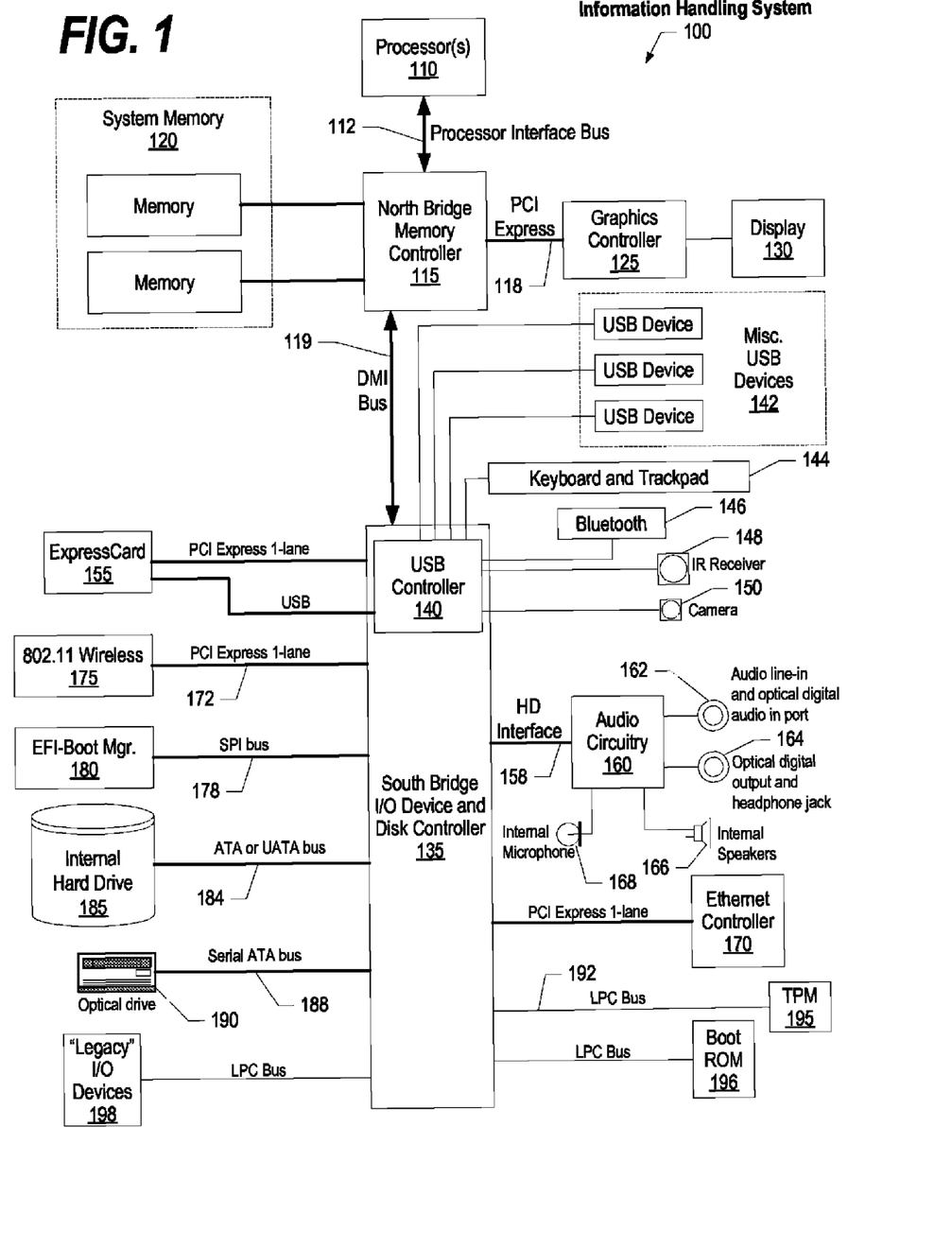
FIG. 1 is a block diagram of a data processing system in which the methods described herein can be implemented.
Figure 2:
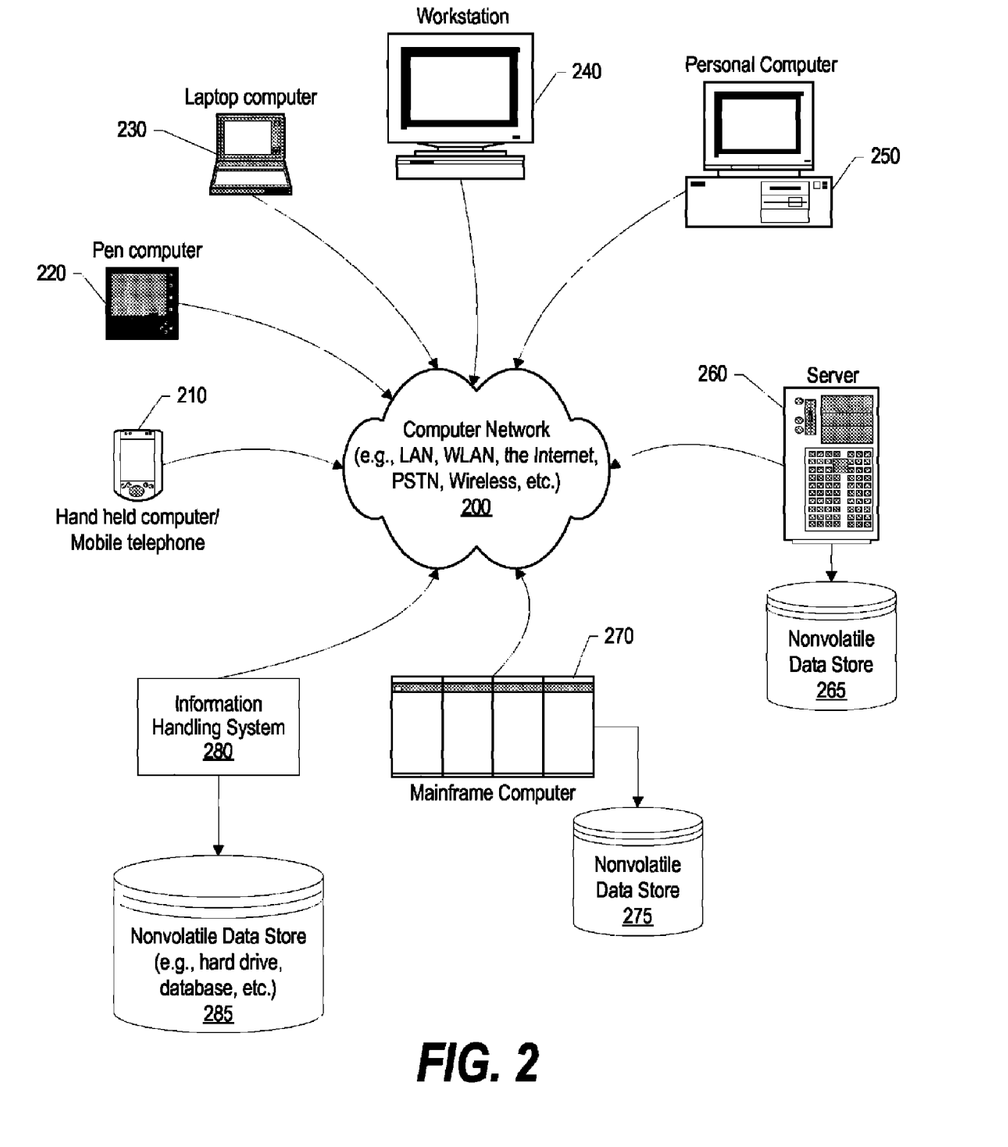
FIG. 2 provides an extension of the information handling system environment shown in FIG. 1 to illustrate that the methods described herein can be performed on a wide variety of information handling systems which operate in a networked environment.

FIG. 1 illustrates information handling system 100 which is a simplified example of a computer system capable of performing the computing operations described herein. Information handling system 100 includes one or more processors 110 which is coupled to processor interface bus 112. Processor interface bus 112 connects processors 110 to Northbridge 115, which is also known as the Memory Controller Hub (MCH). Northbridge 115 is connected to system memory 120 and provides a means for processor(s) 110 to access the system memory. Graphics controller 125 is also connected to Northbridge 115. In one embodiment, PCI Express bus 118 is used to connect Northbridge 115 to graphics controller 125. Graphics controller 125 is connected to display device 130, such as a computer monitor.

Northbridge 115 and Southbridge 135 are connected to each other using bus 119. In one embodiment, the bus is a Direct Media Interface (DMI) bus that transfers data at high speeds in each direction between Northbridge 115 and Southbridge 135. In another embodiment, a Peripheral Component Interconnect (PCI) bus is used to connect the Northbridge and the Southbridge. Southbridge 135, also known as the I/O Controller Hub (ICH) is a chip that generally implements capabilities that operate at slower speeds than the capabilities provided by the Northbridge. Southbridge 135 typically provides various busses used to connect various components. These busses can include PCI and PCI Express busses, an ISA bus, a System Management Bus (SMBus or SMB), a Low Pin Count (LPC) bus. The LPC bus is often used to connect low-bandwidth devices, such as boot ROM 196 and "legacy" I/O devices (using a "super I/O" chip). The "legacy" I/O devices (198) can include serial and parallel ports, keyboard, mouse, floppy disk controller. The LPC bus is also used to connect Southbridge 135 to Trusted Platform Module (TPM) 195. Other components often included in Southbridge 135 include a Direct Memory Access (DMA) controller, a Programmable Interrupt Controller (PIC), a storage device controller, which connects Southbridge 135 to nonvolatile storage device 185, such as a hard disk drive, using bus 184.

ExpressCard 155 is a slot used to connect hot-pluggable devices to the information handling system. ExpressCard 155 supports both PCI Express and USB connectivity as it is connected to Southbridge 135 using both the Universal Serial Bus (USB) the PCI Express bus. Southbridge 135 includes USB Controller 140 that provides USB connectivity to devices that connect to the USB. These devices include webcam (camera) 150, infrared (IR) receiver 148, Bluetooth device 146 which provides for wireless personal area networks (PANs), keyboard and trackpad 144, and other miscellaneous USB connected devices 142, such as a mouse, portable storage devices, modems, network cards, ISDN connectors, fax, printers, USB hubs, and many other types of USB connected devices.

Wireless Local Area Network (LAN) device 175 is connected to Southbridge 135 via the PCI or PCI Express bus 172. LAN device 175 typically implements one of the IEEE 802.11 standards of over-the-air modulation techniques that all use the same protocol to wireless communicate between information handling system 100 and another computer system or device. Optical storage device 190 is connected to Southbridge 135 using Serial ATA (SATA) bus 188. Serial ATA adapters and devices communicate over a high-speed serial link. The Serial ATA bus is also used to connect Southbridge 135 to other forms of storage devices, such as hard disk drives. Audio circuitry 160, such as a sound card, is connected to Southbridge 135 via bus 158. Audio circuitry 160 is used to provide functionality such as audio line-in and optical digital audio in port 162, optical digital output and headphone jack 164, internal speakers 166, and internal microphone 168. Ethernet controller 170 is connected to Southbridge 135 using a bus, such as the PCI or PCI Express bus. Ethernet controller 170 is used to connect information handling system 100 with a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted Platform Module (TPM 195) shown in FIG. 1 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 2. Moreover, the security subsystem can be programmed in a software implementation that emulates the functions of a hardware-based TPM.

FIG. 2 provides an extension of the information handling system environment shown in FIG. 1 to illustrate that the methods described herein can be performed on a wide variety of information handling systems which operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as MP3 players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling system include nonvolatile data stores, such as hard drives and/or nonvolatile memory. Some of the information handling systems shown in FIG. 2 are depicted with separate nonvolatile data stores (server 260 is shown with nonvolatile data store 265, mainframe computer 270 is shown with nonvolatile data store 275, and information handling system 280 is shown with nonvolatile data store 285). The nonvolatile data store can be a component that is external to the various information handling systems or can be internal to one of the information handling systems. In addition, while not shown, an individual nonvolatile data store can be shared amongst two or more information handling systems using various techniques.

Figure 3:
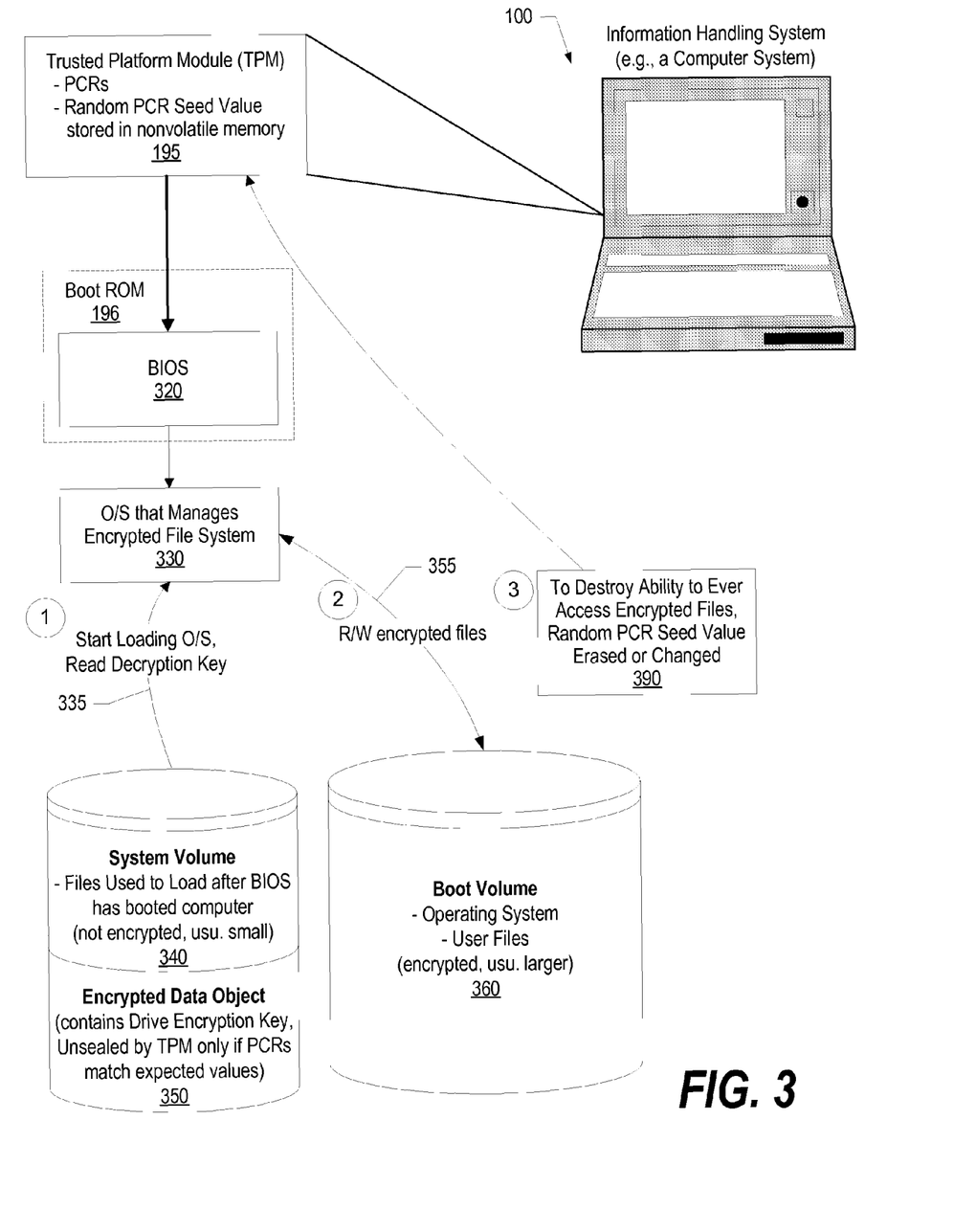
FIG. 3 is a diagram showing how seeding the PCRs with a stored random number allows for effectively erasing the encrypted files stored in an encrypted file system by modifying the random number.

FIG. 3 is a diagram showing how seeding the PCRs with a stored random number allows for effectively erasing the encrypted files stored in an encrypted file system by modifying the random number. Information handling system 100, such as a computer system, includes Trusted Platform Module (TPM) 195. As indicated, among other features, the TPM is a security subsystem that includes secures expected Platform Configuration Registers (PCRs) and a random number that is stored in the TPM's nonvolatile memory. Expected PCRs are first data areas that are secured by the security subsystem (e.g., the TPM). The system depicted in FIG. 3 has previously been initialized using the steps shown in FIGS. 5 and 6 for generating a random number that is used to seed one or more of the PCRs. When the system initializes, the stored random number is retrieved from the nonvolatile memory and this random number is used to initialize, or "seed," one or more of the Platform Configuration Registers (PCRs). The PCRs are second data areas that, as explained below, will be updated during the boot process and, at some point, the PCRs will be compared by the security subsystem (e.g., the TPM) to the expected PCRs that are secured by the security subsystem in order to unseal (decrypt) data.

During the boot process of the information handling system, boot ROM 196 executes basic input/output system (BIOS) code 320. After BIOS code 320 has started executing, at step 330, the BIOS initializes the launch of an operating system that manages an encrypted file system (EFS). One embodiment of an O/S running an encrypted file system in a Windows™ based operating system running, such as Windows XP™ or Windows Vista™, that is running Microsoft Corporation's BitLocker™ Drive Encryption. At step 335, the boot process starts loading the operating system, such as Windows Vista™ licensed by Microsoft Corporation, by reading and executing system volume files 340. System volume 340 includes files that are stored on nonvolatile storage (e.g., a hard drive) and are executed and loaded after the BIOS has booted the system but before the operating system has been fully loaded. As noted, this system volume includes operating system files, is not encrypted, and is generally a smaller volume than boot volume 360. During the boot process (the BIOS initialization and while the operating system is being started), measurements are taken using a hash algorithm, such as a SHA-1 hash function, resulting in hash values. These hash values are used to update the PCRs.

Before the operating system can execute an encrypted file system, such as Microsoft Corporation's BitLocker™ Drive Encryption, it retrieves a drive encryption key from decryption key file 350. Decryption key file 350 is an encrypted data object that has been sealed by the TPM. At a particular point in the boot process, the operating system requests that the TPM unseal (decrypt) decryption key file 350 so that the operating system can retrieve the drive encryption key from encrypted data object 350 and use the drive encryption key to manage the encrypted file system (EFS), e.g., using Microsoft Corporation's BitLocker™ Drive Encryption. The TPM will unseal the decryption key file only if the PCRs (having been seeded with the stored random number and updated by results from the hashing algorithm) match the expected PCRs that are secured by the TPM. If an attempt was made to circumvent the system's security by replacing or altering BIOS or operating system code used to boot the system, the measurements taken on the altered code would result in different hash values and, consequently, result in one or more of the PCRs not matching the expected PCRs, and the TPM will not unseal (decrypt) encrypted data object 350.

If encrypted data object 350 was successfully unsealed by the TPM, then the operating system retrieves the drive encryption key and uses the key to manage the encrypted file system. At step 355, the operating system is shown reading and writing encrypted files to boot volume 360. As indicated, boot volume 360 is generally larger than system volume 340 and includes both operating system files and user files. Software, such as Microsoft Corporation's BitLocker™ drive encryption technology, uses the drive encryption key to read (decrypt) and write (encrypt) files to the nonvolatile storage where boot volume 360 is maintained.

At step 390, the user wishes to destroy the ability of the system to read files written by the encrypted file system (EFS). As pointed out in the Background Section, the prior art attempts to accomplish this task by erasing encrypted data object 350. However, if another copy of encrypted data object 350 exists (such as on a backup media), the encrypted data object can be replaced and the encrypted files in boot volume 360 can once again be read. This is because the PCR values will match the expected PCR values and, therefore, the TPM will still decrypt the encrypted data object when requested. In contrast, the present invention, using the stored random number to seed the PCRs, inhibits access to the encrypted files in boot volume 360 by altering (e.g., modifying or erasing) the PCR seed value. After the PCR seed value has been altered, the PCRs will no longer match the expected PCRs and the TPM will not unseal encrypted data object 350. Without encrypted data object 350 being unsealed, the encrypted file system software (e.g., BitLocker™) will be unable to retrieve the drive encryption key used to manage the encrypted file system.

Figure 4:
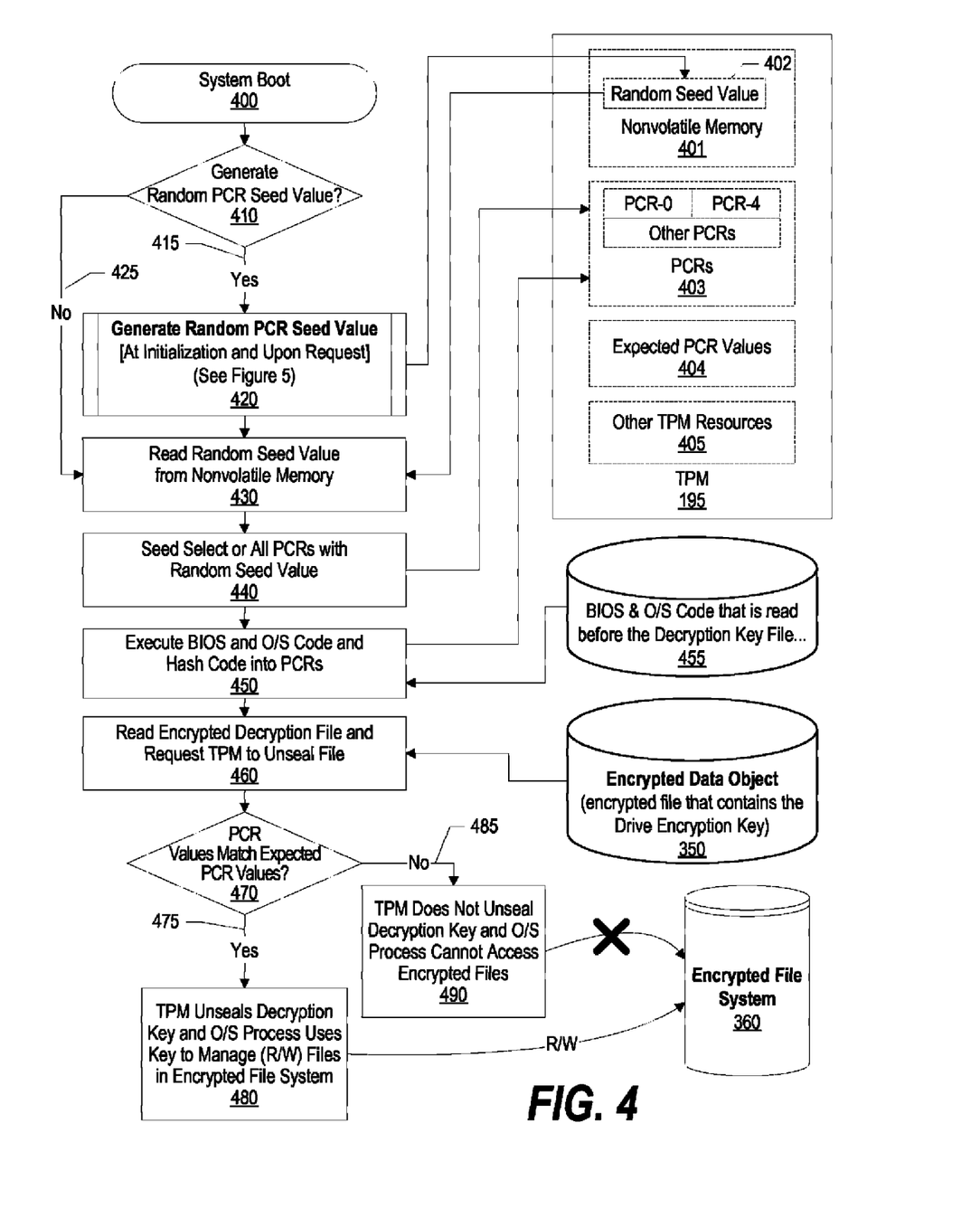
FIG. 4 is a flowchart showing the steps that occur when the system is booted and PCRs are seeded with a stored random number.

FIG. 4 is a flowchart showing the steps that occur when the system is booted and PCRs are seeded with a stored random number. System boot processing commences at 400 whereupon a determination is made as to whether to generate a random number to use as a seed value for Platform Configuration Registers (PCRs). Decision 410 is based on determining whether the system is new and has not yet been configured by the user (e.g., a first-use initialization) or based on a user request, such as the user pressing a key or key combination (e.g., pressing "escape") during the boot process in order to access BIOS and other system setup functions. If the system is generating a new, or different, random PCR seed value, then decision 410 branches to "yes" branch 415 whereupon, at predefined process 420, the random PCR seed value is generated and stored in nonvolatile storage (see FIG. 5 and corresponding text for processing details). On the other hand, if a new, or different, random number is not being generated to be used as a seed value for PCRs, then decision 410 branches to "no" branch 425 bypassing predefined process 420.

At step 430, a previously generated random number is read from storage location 402 within nonvolatile memory 401. In one embodiment, nonvolatile memory 401 is a nonvolatile memory within Trusted Platform Module (TPM) 195. In another embodiment, nonvolatile memory 401 is outside TPM 195. In any case, steps are taken so that the stored random number is not erased, either accidentally or purposefully by a malicious user or automated process. This is because, as explained below, if the stored random number is erased, the encrypted file system will be unable to retrieve the drive encryption key from encrypted data object 350 and, consequently, will no longer be able to read or write encrypted files, essentially erasing (inhibiting access) to any encrypted files previously written by the encrypted file system to nonvolatile storage (e.g., nonvolatile storage 360).

At step 440, one or more PCRs are initialized to the random number retrieved at step 430 (again, if a random number is not being used by the system, then step 440 is not performed and the PCRs are initialized to a known (non-random) number at step 440). The particular PCRs that are seeded with the random number is a system design consideration. In one embodiment, PCR-0 is seeded with the random number. In another embodiment, PCRs 0 and 4 are seeded with the random number, and in a third embodiment, all PCRs are seeded with the random number. Also, as used herein, "seeding" the PCRs with the random number does not mean or imply that the PCRs are initialized to the random number. Instead, the random number is applied to the PCRs at any point in the process (e.g., the random number could be applied to the PCRs at the beginning (initialization), at the end, or any point in between). At step 450, BIOS and O/S code 455 are measured and executed. Code is measured using a hashing algorithm, such as the SHA-1 hashing algorithm. The use of the hashing algorithm on the BIOS and O/S code results in one or more hash values that are applied to the PCRs. As appreciated by those skilled in the art, when a value, such as the random number or hash result, is applied to a given PCR it does not replace the value of the PCR but, instead, is combined with the PCRs current value in order to result in a new PCR value. Before any values are applied to the PCRs, the PCRs are initialized to a known value (e.g., '0000'), then the PCRs are updated using the various hash values and the random seed value (if the random seed value is being applied to the given PCR).

At step 460, the O/S starts execution of its encrypted file system (EFS). In order for the encrypted file system to operate, the EFS needs a drive encryption key that is stored in encrypted data object 350. Encrypted data object 350 is an encrypted file that is sealed by the TPM. At step 460, the O/S requests that the TPM unseal encrypted data object 350 so that the O/S's encrypted file system can read and use the drive encryption key that is used to manage encrypted file system 360. A determination is made by the TPM as to whether the PCRs, having been updated by the various hash values and the random number, match expected PCR values 404 that are stored by the TPM (decision 470). While shown stored in the TPM, in one embodiment, expected PCRs values 404 are stored in a sealed data blob outside of the TPM. In other words, expected PCR values 404 are stored in a nonvolatile data area that is secured by the TPM. In this embodiment, the TPM unseals the data blob to read the expected PCR values to perform the comparison at decision 470. If the values PCR values match the expected PCR values, then decision 470 branches to "yes" branch 475 whereupon, at step 480, the TPM unseals the encrypted data object and the O/S's encrypted file system uses the drive encryption key to manage (read and write) files in encrypted file system 360. On the other hand, if the PCR values do not match the expected PCR values, then decision 470 branches to "no" branch 485 whereupon, at step 490, the TPM does not unseal encrypted data object 350 resulting in the O/S's encrypted file system being unable to obtain the drive encryption key that is used to manage encrypted file system 360.

Figure 5:
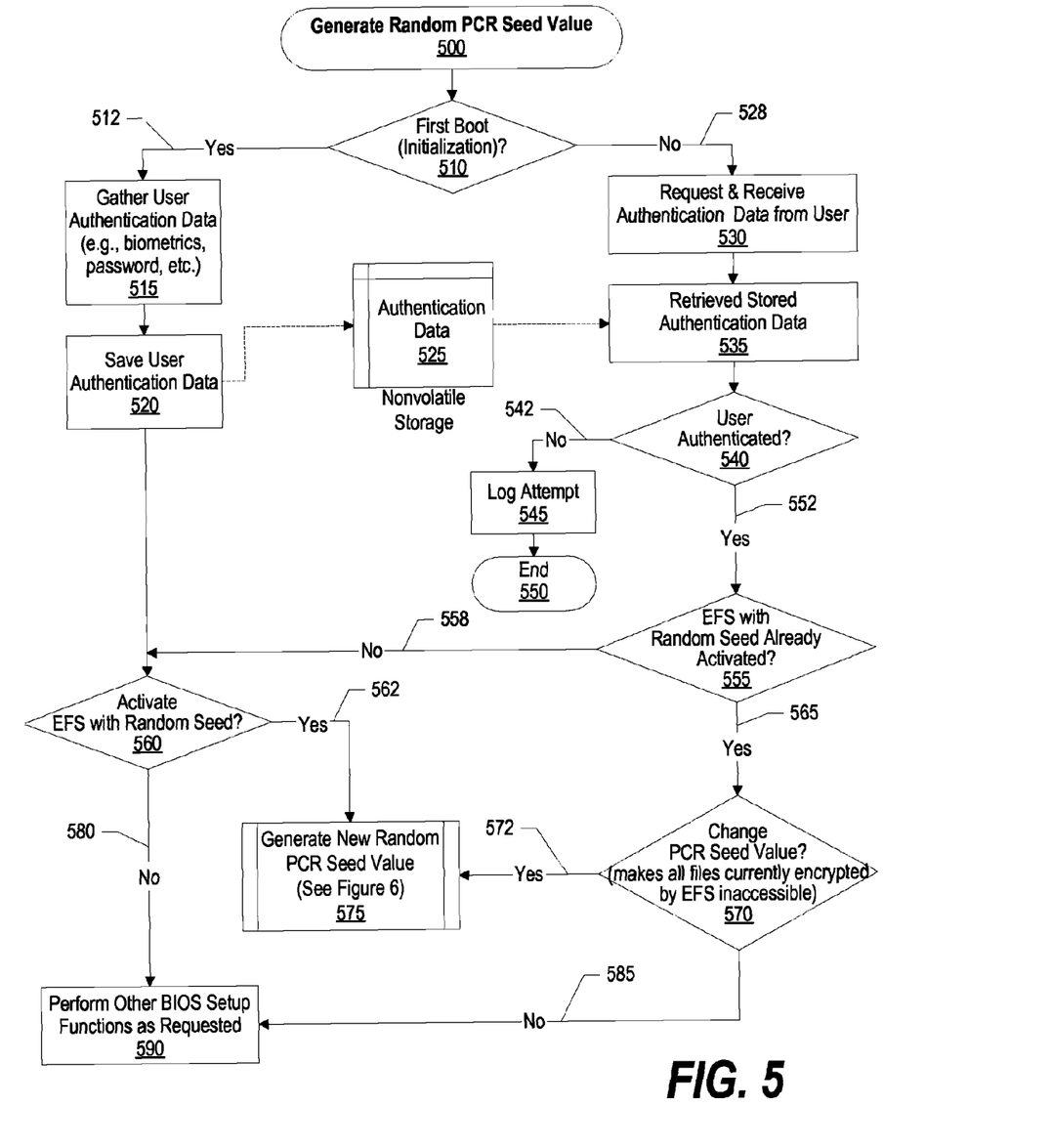
FIG. 5 is a flowchart showing the steps that occur when generating a new random number that is used to seed the PCRs.

FIG. 5 is a flowchart showing the steps that occur when generating a new random number that is used to seed the PCRs. The steps shown in FIG. 5 are performed when predefined process 420 (shown in FIG. 4) is executed. Generally, these steps are performed either when a system is initially booted for the first time by the user (customer), or upon request by the user early in the boot process before the operating system has been launched (e.g., by pressing a key or key combination when prompted by the BIOS boot process). Processing commences at 500 whereupon, a determination is made as to whether this is a first boot of the computer system (decision 510). If this is a first boot of the system, then decision 510 branches to "yes" branch 512 whereupon, at step 515, the system gathers user authentication data that will be used to authenticate the user to the computer system. Authentication data can include a password, a user identifier/password combination, biometric data, or the like. At step 520, the user authentication data is stored in authentication data store 525 which is stored in a nonvolatile memory. In one embodiment, authentication data 525 is stored so that it is accessible by the BIOS process that is performing the steps shown in FIG. 5 (e.g., an encrypted file) but is not generally accessible by untrusted processes that may execute on the computer system.

On the other hand, if this is not the first boot of the computer system and the system has already been initialized with the user's authentication data, then decision 510 branches to "no" branch 528 whereupon, at step 530, the BIOS process requests and receives authentication data from the user (e.g., password, user identifier/password combination, biometric data, etc.). At step 525, the stored authentication data is retrieved from authentication data store 525 and compared to the authentication data provided by the user. A determination is made as to whether the user is authenticated (decision 540). If the user is not authenticated, then decision 540 branches to "no" branch 542 whereupon, at step 545, a log is made of the attempt to change the BIOS settings, and processing ends at 550. On the other hand, if the user is authenticated, then decision 540 branches to "yes" branch 552 whereupon a determination is made as to whether a random number is already being used to seed the PCRs (decision 555). If a random number is not already being used to seed the PCRs, then decision 555 branches to "no" branch 558.

If this is either a first boot of the computer system or if a random number is not already being used to seed the PCRs, then a determination is made as to whether to activate seeding the PCRs with a random number (decision 560). This determination can be made by prompting the user and receiving an appropriate response. If seeding the PCRs with a random number is being activated, then decision 560 branches to "yes" branch 562 whereupon, at predefined process, a new random number is generated and stored for use in seeding the PCRs (see FIG. 6 and corresponding text for processing details). On the other hand, if the user does not wish to activate seeding the PCRs with a random number, then decision 560 branches to "no" branch 580 whereupon, at step 590 other BIOS functions are performed as requested by the user.

Returning to decision 555, if the PCRs are already being seeded with a stored random number, then decision 555 branches to "yes" branch 565 whereupon a determination is made as to whether to change the random number that is used to seed the PCRs (decision 570). In one embodiment, this decision is made by prompting the user and warning the user that changing the random number that is used to seed the PCRs will result in making all files currently being managed by the encrypted file system (EFS) inaccessible. This is because, as explained in relation to FIG. 4, when the random number is changed and the system is booted, the new random number will be used to seed the PCRs resulting in different PCR values and, consequently, the TPM will no longer unseal the encrypted data object that is used to store the drive encryption key. If the user wishes to change the stored random number, then decision 570 branches to "yes" branch 572 whereupon, at predefined process 575, a new random number is generated and stored (see FIG. 6 and corresponding text for processing details). During the next boot of the computer system, the newly generated random number will be used to seed the PCRs resulting in the TPM refusing to unseal the encrypted data object that is being used to store the drive encryption key. On the other hand, if the user does not what to change the stored random number, then decision 570 branches to "no" branch 585 whereupon, at step 590 other BIOS functions are performed as requested by the user.

Figure 6:
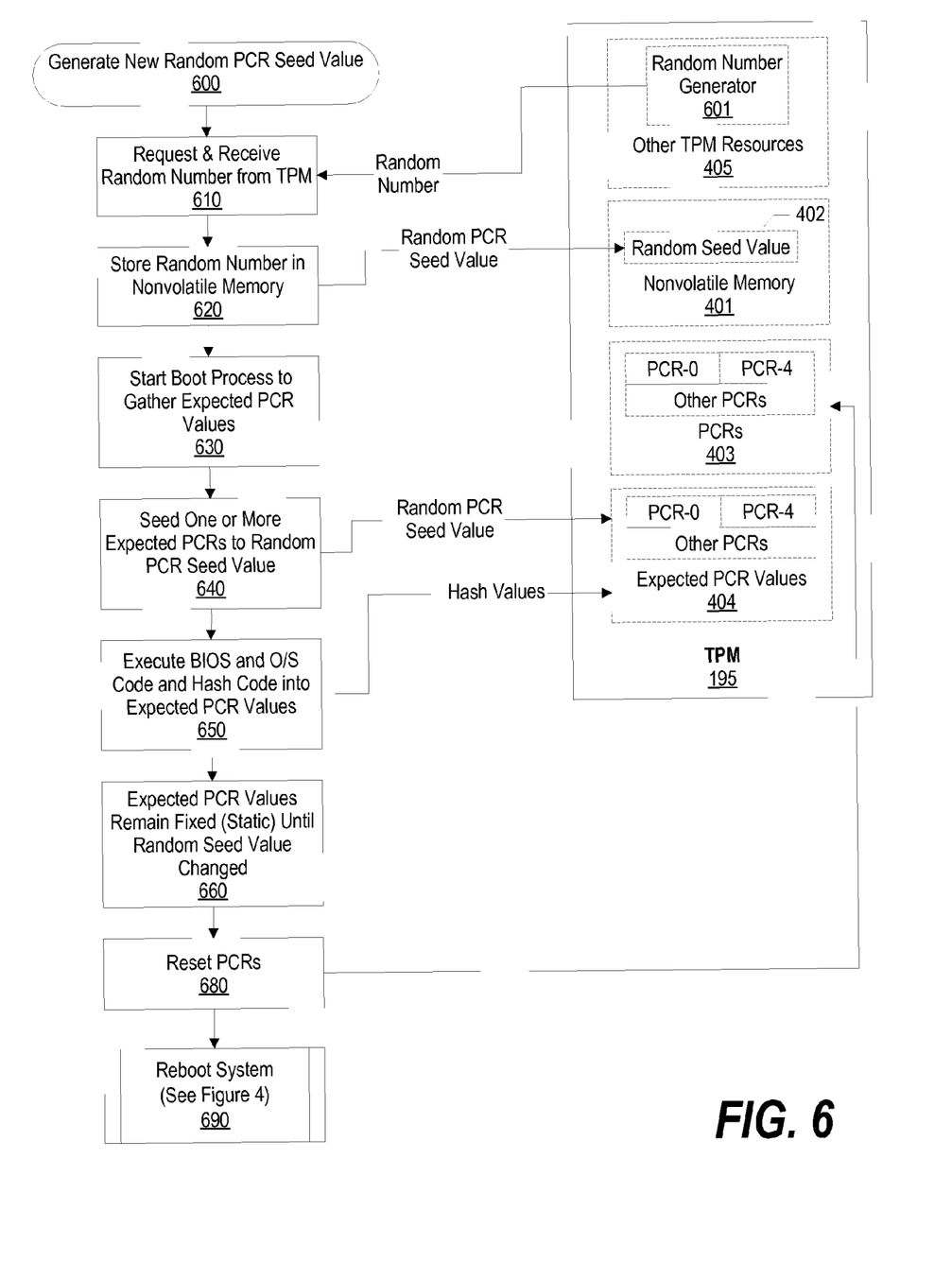
FIG. 6 is a flowchart showing more detailed steps that occur when generating the new random number PCR seed value.

FIG. 6 is a flowchart showing more detailed steps that occur when generating the new random number PCR seed value. The steps shown in FIG. 6 are performed when a new, or different, random number is desired. If a different random number is being requested, the newly generated random number will replace the previously stored random number. During the next boot of the computer system, the new random number, rather than the previously stored random number, will be used to seed the PCRs resulting in the TPM refusing to unseal the encrypted data object where the drive encryption key is stored. Consequently, the O/S's encrypted file system (EFS), not having access to the drive encryption key, will be unable to access (read) any files previously stored in the encrypted file system during the time that the previous random number was being used by the system to seed the PCRs.

At step 610, a random number is requested and received. In one embodiment, the random number is requested and received from random number generator 601 which is one of TPM's 195 additional resources 405. At step 620, the random number that was received is stored in storage location 402 within nonvolatile memory 401. In one embodiment, nonvolatile memory 401 is a nonvolatile memory within TPM 195.

At step 630, the system's boot process is started in order to gather expected PCR values. At step 640, one or more expected PCRs 404 are seeded with the newly generated random number. As previously discussed, the particular PCRs that are seeded with the random number is a program design consideration. In one embodiment, PCR-0 is seeded with the random number. In another embodiment, PCRs 0 and 4 are seeded with the random number, and in a third embodiment, all PCRs are seeded with the random number. Also, as previously discussed, "seeding" the PCRs with the random number does not mean or imply that the PCRs are initialized to the random number. Instead, the random number is applied to the PCRs at any point in the process (e.g., the random number could be applied to the PCRs at the beginning (initialization), at the end, or any point in between). At step 650, BIOS and O/S code are measured and executed. Code is measured using a hashing algorithm, such as the SHA-1 hashing algorithm. The use of the hashing algorithm on the BIOS and O/S code results in one or more hash values that are applied to the PCRs. As appreciated by those skilled in the art, when a value, such as the new random number or a hash result, is applied to a given PCR it does not replace the value of the PCR but, instead, is combined with the PCRs current value in order to result in a new PCR value. Before any values are applied to the PCRs, the PCRs are initialized to a known value (e.g., '0000'), then the PCRs are updated using the various hash values and the random seed value (if the random seed value is being applied to the given PCR).

Step 660 notes that the expected PCR values, once established, remain fixed, or static, until the random number that is used to seed the PCRs is modified (or until one of the startup programs (BIOS or O/S) is legitimately altered resulting in different hash value for the changed program(s) which results in different (changed) expected PCR values. At step 680, the PCRs (the PCRs, not the expected PCRs) are reset to a known value, such as zeros. At predefined process 690 the system is rebooted (see FIG. 4 and corresponding text for processing details). However, now the expected PCRs are different and the PCRs that result from the processing shown in FIG. 4 will have to match the new expected PCRs in order for the TPM to unseal the encrypted data object. Note that just because the PCRs match the expected PCRs in the rebooted system, the TPM will still not unseal the encrypted data object if a different random number was used as the PCR seed value when the encrypted data object was sealed. This is because, not only do the PCR values have to match the expected PCR values in order to unseal the encrypted data object, but the PCR values need to be values that were previously stored in the TPM.

One of the preferred implementations of the invention is a client application, namely, a set of instructions (program code) or other functional descriptive material in a code module that may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps. Functional descriptive material is information that imparts functionality to a machine. Functional descriptive material includes, but is not limited to, computer programs, instructions, rules, facts, definitions of computable functions, objects, and data structures.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A machine-implemented method comprising:
   initializing one or more expected Platform Configuration Registers (expected PCRs) in a nonvolatile data area, wherein the expected PCRs are secured by a hardware-based Trusted Platform Module (TPM), wherein the initializing is performed by:
      generating a random number;
      storing the generated random number in a nonvolatile memory;
      seeding one or more of the expected PCRs with the generated random number;
      inputting a plurality of startup code processes to a hash algorithm process resulting in a first plurality of hash values;
      updating the expected PCRs using the first plurality of hash values; and
      saving the expected PCRs in the nonvolatile data area that is secured by the TPM;
   storing a plurality of encrypted files, each of the encrypted files encrypted using a drive encryption key stored in an encrypted data object; and
   booting the machine one or more times after the initializing, during each of the boots:
      retrieving, by the TPM, the previously stored random number from the nonvolatile memory;
      seeding one or more Platform Configuration Registers (PCRs) with the retrieved random number;
      inputting the plurality of startup code processes to the hash algorithm process resulting in a second plurality of hash values;
      updating the PCRs using the second plurality of hash values; and
      decrypting the encrypted data object in response to the PCRs being the same as the corresponding expected PCRs.

2. The method of claim 1 wherein the startup code processes include one or more BIOS processes and one or more operating system boot processes, and wherein the random number is generated using a random number generator included in the TPM, the method further comprising:
   receiving a request from a user of the machine to activate the seeding of the expected PCRs with the random number, in response to the receiving the request:
      receiving authentication data from the user; and
      storing the received authentication data in a secure nonvolatile storage area.

3. The method of claim 1 further comprising:
   after the storing of the plurality of files, making the stored plurality of encrypted files inaccessible by modifying the stored random number.

4. The method of claim 3 further comprising:
   receiving user authentication data from a user of the machine; and
   retrieving a previously stored user authentication data, wherein the modifying of the stored random number is performed in response to the received user authentication data matching the previously stored user authentication data.

5. The method of claim 3 further comprising:
   rebooting the machine after the modifying of the stored random number, the rebooting including:
      retrieving the modified stored random number from the nonvolatile memory;
      seeding the plurality of PCRs with the retrieved modified random number;
      inputting the plurality of startup code processes to the hash algorithm process resulting in a third plurality of hash values;
      updating the PCRs using the third plurality of hash values; and
      inhibiting decryption of the encrypted data object that includes the drive encryption key in response to the one or more PCRs being different than the corresponding one or more selected from the expected PCRs.

6. The method of claim 3 wherein the modification of the stored random number comprises:
   generating a second random number using a random number generator included in the TPM; and
   overwriting of the random number by storing the second random number in the nonvolatile memory.

7. A information handling system comprising:
   one or more processors;
   a memory accessible by at least one of the processors;
   one or more nonvolatile storage areas accessible by at least one of the processors;
   a plurality of startup code processes stored in the nonvolatile storage areas;
   a Trusted Platform Module (TPM) that secures a plurality of expected Platform Configuration Registers (PCRs) stored in a first secure nonvolatile memory;
   a random number generator included in the TPM; and
   a set of instructions stored in the memory and executed by at least one of the processors in order to perform actions of:
      initializing a plurality of the expected PCRs by:
         generating a random number using the TPM's random number generator;
         storing the generated random number in the second secure nonvolatile memory;
         seeding one or more of the expected PCRs with the generated random number;
         inputting the startup code processes to a hash algorithm process resulting in a first plurality of hash values;
         updating the expected PCRs using the first plurality of hash values; and
         saving the expected PCRs in one of the nonvolatile storage areas, wherein the nonvolatile storage area used to save the expected PCRs is secured by the TPM;
      storing a plurality of encrypted files, each of the plurality of encrypted files encrypted using a drive encryption key stored in an encrypted data object; and
      booting the information handling system one or more times after the initializing, during each of the boots:

retrieving, by the TPM, the previously stored random number from the nonvolatile storage area;

seeding a plurality of PCRs with the retrieved random number;

inputting the plurality of startup code processes to the hash algorithm process resulting in a second plurality of hash values;

updating the PCRs using the second plurality of hash values; and decrypting the encrypted data object stored on one of the nonvolatile storage areas in response to the one or more PCRs being the same as the corresponding one or more selected from the expected PCRs.

8. The information handing system of claim 7 wherein the startup code processes include one or more BIOS processes and one or more operating system boot processes and wherein the set of instructions, when executed, cause at least one of the processors to perform further actions comprising:

receiving a request from a user of the information handling system to activate the seeding of the expected PCRs with the random number, in response to the receiving the request:

receiving authentication data from the user; and storing the received authentication data in a secure nonvolatile storage area.

9. The information handing system of claim 7 wherein the set of instructions, when executed, cause at least one of the processors to perform further actions comprising:

after the storing of the plurality of files, making the stored plurality of encrypted files inaccessible by modifying the stored random number.

10. The information handing system of claim 9 wherein the set of instructions, when executed, cause at least one of the processors to perform further actions comprising:

receiving user authentication data from a user of the information handling system; and retrieving a previously stored user authentication data, wherein the modifying of the stored random number is performed in response to the received user authentication data matching the previously stored user authentication data.

11. The information handing system of claim 9 wherein the set of instructions, when executed, cause at least one of the processors to perform further actions comprising:

rebooting the information handling system after the modifying of the stored random number, the rebooting including:

retrieving the modified stored random number from the nonvolatile memory;

seeding the plurality of PCRs with the retrieved modified random number;

inputting the plurality of startup code processes to the hash algorithm process resulting in a third plurality of hash values;

updating the PCRs using the third plurality of hash values; and inhibiting decryption of the encrypted data object that includes the drive encryption key in response to the one or more PCRs being different than the corresponding one or more selected from the expected PCRs.

12. The information handing system of claim 9 wherein the set of instructions, when executed, cause at least one of the processors to perform further actions comprising:

generating a second random number using a random number generator included in the TPM; and overwriting of the random number by storing the second random number in the nonvolatile memory.

13. A computer program product stored in a non-transitory computer readable medium, comprising functional descriptive material that, when executed by an information handling system, causes the information handling system to perform actions that include:

initializing one or more expected Platform Configuration Registers (PCRs) in a nonvolatile data area, wherein the expected PCRs are secured by a hardware-based Trusted Platform Module (TPM), wherein the initializing is performed by:

generating a random number;

storing the generated random number in a nonvolatile memory;

seeding one or more of the expected PCRs with the generated random number;

inputting a plurality of startup code processes to a hash algorithm process resulting in a first plurality of hash values;

updating the expected PCRs using the first plurality of hash values; and saving the expected PCRs in the nonvolatile data area that is secured by the TPM;

storing a plurality of encrypted files, each of the encrypted files encrypted using a drive encryption key stored in an encrypted data object; and booting the machine one or more times after the initializing, during each of the boots:

retrieving, by the TPM, the previously stored random number from the nonvolatile memory;

seeding one or more Platform Configuration Registers (PCRs) with the retrieved random number;

inputting the plurality of startup code processes to the hash algorithm process resulting in a second plurality of hash values;

updating the PCRs using the second plurality of hash values; and decrypting the encrypted data object in response to the PCRs being the same as the corresponding expected PCRs.

14. The computer program product of claim 13 wherein the startup code processes include one or more BIOS processes and one or more operating system boot processes, and wherein the random number is generated using a random number generator included in the TPM, and further comprising functional descriptive material that causes the data processing system to perform additional actions that include:

receiving a request from a user of the machine to activate the seeding of the expected PCRs with the random number, in response to the receiving the request:

receiving authentication data from the user; and storing the received authentication data in a secure nonvolatile storage area.

15. The computer program product of claim 13 further comprising functional descriptive material that causes the data processing system to perform additional actions that include:

after the storing of the plurality of files, making the stored plurality of encrypted files inaccessible by modifying the stored random number.

16. The computer program product of claim 15 further comprising functional descriptive material that causes the data processing system to perform additional actions that include:

rebooting the machine after the modifying of the stored random number, the rebooting including:
  retrieving the modified stored random number from the nonvolatile memory;
  seeding the plurality of PCRs with the retrieved modified random number;
  inputting the plurality of startup code processes to the hash algorithm process resulting in a third plurality of hash values;
  updating the PCRs using the third plurality of hash values; and
  inhibiting decryption of the encrypted data object that includes the drive encryption key in response to the one or more PCRs being different than the corresponding one or more selected from the expected PCRs.

17. The computer program product of claim 15 wherein the modification of the stored random number further comprises functional descriptive material that causes the data processing system to perform additional actions that include:
  generating a second random number using a random number generator included in the TPM; and
  overwriting of the random number by storing the second random number in the nonvolatile memory.

* * * * *